United States Patent [19]

Firmin

[11] 4,214,396
[45] Jul. 29, 1980

[54] FISHING LURES

[76] Inventor: Herman P. Firmin, 11325 Granberry St., Baton Rouge, La. 70811

[21] Appl. No.: 941,567

[22] Filed: Sep. 11, 1978

[51] Int. Cl.$^2$ ............................................. A01K 85/00
[52] U.S. Cl. .................................... 43/42.24; 43/42.1; 43/42.15
[58] Field of Search .................... 43/42.24, 42.1, 42.15

[56] References Cited

U.S. PATENT DOCUMENTS

| | | | |
|---|---|---|---|
| 994,927 | 6/1911 | Jefferson | 43/42.1 |
| 1,209,022 | 12/1916 | Phinney | 43/42.15 |
| 1,828,574 | 10/1931 | Neukam | 43/42.15 |
| 2,235,600 | 3/1941 | Ammerman | 43/42.24 |
| 2,468,877 | 5/1949 | Horton | 43/42.24 |
| 2,606,389 | 8/1952 | Fortmann | 43/42.15 |
| 2,722,766 | 11/1955 | Accetta | 43/42.24 |
| 2,979,850 | 4/1961 | Lund | 43/42.24 |
| 2,994,982 | 8/1961 | Murawski | 43/42.1 |
| 3,070,917 | 1/1963 | Rowe | 43/42.24 |
| 3,724,116 | 4/1973 | Lindner et al. | 43/42.24 |
| 3,983,656 | 10/1976 | Bain | 43/42.24 |

FOREIGN PATENT DOCUMENTS 640471  5/1962  Canada ..................... 43/42.24

*Primary Examiner*—Nicholas P. Godici
*Assistant Examiner*—J. T. Zatarga
*Attorney, Agent, or Firm*—Llewellyn A. Proctor

[57] ABSTRACT

An aquatic fishing lure, or bait, as an article of manufacture, for use with a rod, line and hook, and usually a reel. The lure is comprised of an elongate body over the length of which is extended a thin, flexible dorsal fin, or membraneous-like member which, when the lure is placed in water and moved relative thereto, the fin will undulate or ripple to simulate life-like action. Generally, the fin extends over at least one-half, and preferably from about 75 percent to 95 percent of the length of the elongate body. The elongate body member is constituted of a rigid, semirigid or flexible material, and in its most preferred form is constituted of a flexible plastic material, notably worm plastic. The elongate body, in a preferred embodiment, is worm-like in appearance, and provided with striae, which provide a body of knobbed appearance. The flexible fin is preferably formed as an integral part of the elongate body, is generally slightly ruffled and extended from an end of the body which resembles a caudal tail member toward the opposite end of the body which resembles a head.

In another of its aspects, the elongate body rigid or semi-rigid and tapered at both of its ends to provide a tear shaped member which resembles a fish, and a fin of the type described is extended over a major portion of the length of the body, preferably over a length of ranging from about 75 percent to 95 percent of the body.

10 Claims, 3 Drawing Figures

FISHING LURES

Fish, because of their large numbers and ease in harvesting, not only constitute an important food source for man, but also provides an important sport. Recreation fishing is enjoyed throughout the world, and artificial lures and bait have become an important tool in the arsenal of the angler.

Lures are of various constructions, often fashioned with silk, skin, feathers, wood, metals, plastics and other materials to imitate bait such as shrimps, frogs, insects, fish, worms and the like. The latest trend in lure construction is to provide forms which more closely resemble live creatures which arouse the curiousity and rapacity of the fish.

Fish life abounds along shores, and are especially plentiful on offshore banks where the life of the bottom meets that of the upper waters. Fish are carnivorous, as well as omnivorous, and utilize every available food resource; they eat insects that drop onto the surface of the water by chance, eat aquatic larvae of terrestrial insects, or other small creatures which fall, or are washed into the water. Fish also eat smaller fish, and smaller forms of marine animals, e.g., crustaceans and the like. Newly hatched fish are indeed a principal food for many fish. The thrashing, live movements, and noises created by the small creatures attract the fish which constantly move within the depths of the water in quest of food. Modern lures are thus now often designed to dip, pop, gurgle and wabble to simulate live actions. Despite man's ingenuity there is yet a tremendous demand for better, more lifelike artificial lures and baits.

It is accordingly the prime objective of the present invention to provide a new and novel artificial bait or lure, notably one designed to simulate live action.

A particular object is to provide an artificial lure or bait for bait casting or spinning, especially one which can be constructed in a variety of sizes, shapes and colors, and injection molded at low cost.

Yet another object is to provide an artificial lure, or bait of such character especially suitable for use in fishing with rod, line and hook, and usually a reel.

These objects and others are accomplished in accordance with the present invention which embodies an artificial lure or bait comprised of an elongate body member over a major portion of the length of which is extended a thin, flexible dorsal fin, or membraneous-like member which, when the lure is placed in water and moved relative thereto, the fin will undulate or ripple to simulate lifelike action. Generally, the fin extends over at least one-half of the length of the elongate body and, in its preferred aspects, the fin extends over at least about seventy-five percent of the length of the body, most preferably from about seventy-five to about ninety-five percent of the length of the body.

In its preferred aspects also, the elongate body member is constituted of a rigid, semi-rigid or flexible material, and in its most preferred form is constituted of a flexible plastic material, notably worm plastic which is almost flesh-like in its consistency. The elongate body, in such embodiment, is worm-like in appearance, of generally cylindrical shape and provided with striae, spaced apart and concentrically aligned about the central axis of the cylindrical body to provide a body of knobbed appearance. The flexible fin is preferably formed as an integral part of the elongate body, is generally slightly ruffled and extended from an end of the body which resembles a tail, toward the opposite end of the body which resembles a head.

In another of its aspects, the elongate body is tapered at both of its ends to provide a tear shaped member which resembles a fish, and can be constituted of a rigid or semi-rigid material. The flexible, or slightly ruffled fin is extended laterally from one end of the body over a major portion of its length.

In either embodiment, the rearward portion of the "worm" or "fish" can be shaped to form a tail, generally one of caudal shape to resemble the tail of a fish. The worm is generally used as bait by passage of a hook through the upper portion of the elongate body, and the fish which preferably has a rigid or semi-rigid body portion, if desired, can have a plurality of hooks appended to the lower forward and rearward portions of the body.

These and other features will be better understood by reference to the following detailed description of the invention, and to the attached drawings to which reference is made. In the drawings, similar numbers are used to represent similar components in the different figures, and subscripts are used to designate a subcomponent, or portion of a larger component.

Figure 1:
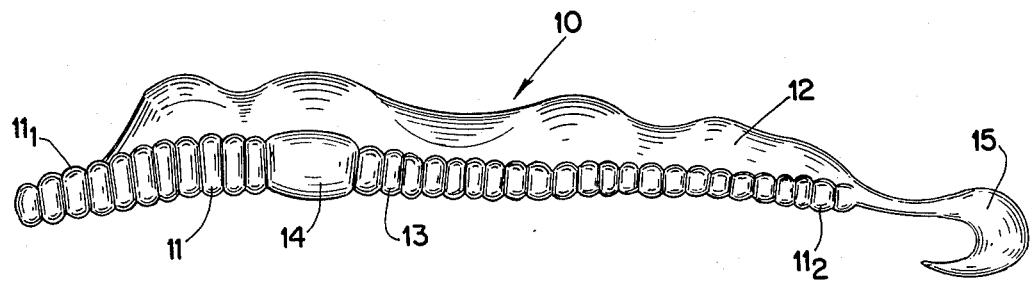
FIG. 1 depicts a side-elevation view of a preferred type of lure resembling a worm constructed of soft, or worm plastic.
Figure 2:
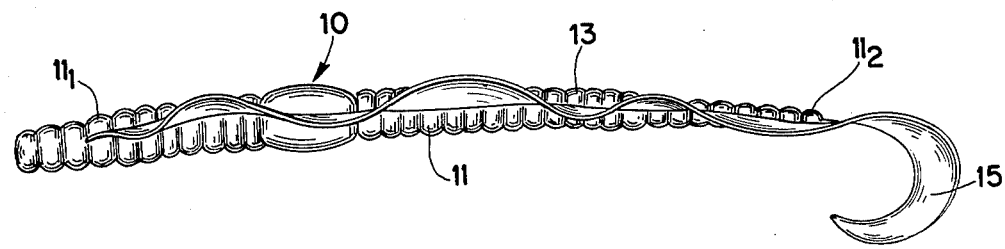
FIG. 2 is a top view of the worm lure of the preceding figure.

Referring to FIGS. 1 and 2, there is shown a plastic worm lure 10, which includes generally an elongate body portion 11 and a ruffled dorsal fin 12. The elongate body 11 is constituted of worm plastic, a plastic of flesh-like consistency which has become widely known and used in the artificial bait industry. The body 11 is of substantially cylindrical cross section, and striated substantially throughout its length with spaced apart indentations or shallow grooves 13 which are generally concentric with the central axis of the body, this providing a knob-like appearance extending over the length of the body. The head portions $11_1$ of the body is relatively large, expecially the knob-like portion 14, through which end a hook (not shown) is usually passed. The cross-sectional diameter of the elongate body is gradually reduced from the head to tail, the tail portion $11_2$ of the body tapering gradually to adjoin with a caudal like projection 15 resembling a fin.

The inner, attached side of the flexible fin 12 lies in-line (attached in substantially a straight line) with the orientation of the body portion of the worm lure 10, and is relatively taut. The outer unattached side of the flexible fin 12 is not taut, and preferably it is of longer length than said inner, attached side and slightly ruffled so that movement of the worm lure 10 through the water, or relative movement of water past the fin, will produce ripples or undulations of the fin to give the appearance of life. The fin 12 is affixed to the body 11, or constructed integrally with the body 11, the fin being membraneous-like, or relatively thin and flat in cross-section as contrasted with the cross-section of the body. And, it tapers into the caudal like projection at the tail portion $11_2$ of the body, which is also membraneous-like, or relatively thin and flat in cross-section as contrasted with the forward or central portion of the elongate body 11.

The worm lure 10 is conveniently formed by injection molding techniques as a unitary member, and can be provided in a limitless variety of colors by addition of dies and inks to the molding recipes. The various colors aid in the reflection of the light from the worm lure 10, the light being transmitted by the undulating fin 12 simulating a glittering luminescent member which aids in the creation of live action.

Figure 3:
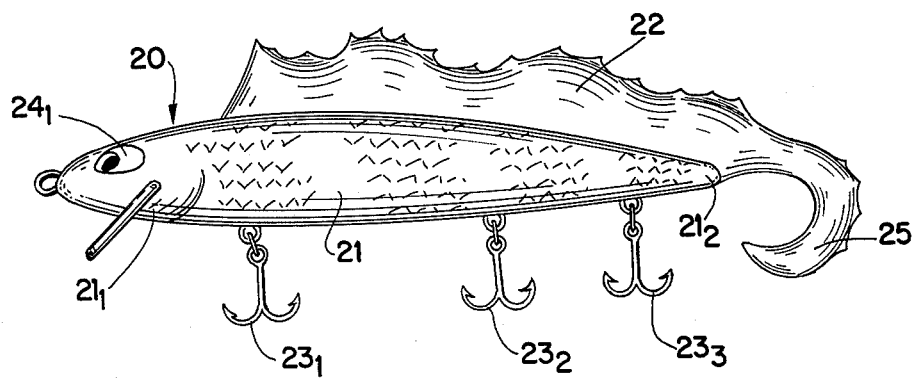
FIG. 3 is a side elevation view of a second type of artificial lure or bait, this lure resembling a fish.

Referring now to FIG. 3 there is shown a fish shaped lure 20, also constituted generally of an elongate body 21 to which a flexible fin 22 is affixed. The inner, attached side of the flexible fin 12 lies in-line (attached in substantially a straight line) with the orientation of the body portion of the body 21, and is relatively taut. The outer unattached side of the fin 22, like fin 21 of worm lure 10, is of longer length than said inner, attached side and slightly ruffled and is extended longitudinally over most of the length of the body 21. Unlike the fin 12 of lure 10, the fin 22 is serated along the upper edge to provide teeth-like, or serrated projections which projects a somewhat different appearance and provides more angular surfaces for reflection of light, and creation of sounds.

The elongate body 21 tapers from a relatively large forward end, or head portion $21_1$, to a smaller rearward end or tail portion $21_2$. The body 21 is generally constituted of a rigid or semi-rigid material, e.g., plastic, metal or wood, and a series of hooks $23_1$, $23_2$, $23_3$ are pivotally attached to the lower portion of the elongate body via hook-like pins which are embedded within the elongate body 21. The exterior portion of the elongate body 21 is painted to provide an appearance of scales, and the head portion of the elongate body is provided with eyes $24_1$, $24_2$ (not shown).

The flexible, or ruffled fin 22, like fin 12, tapers into a caudal-like fin 25. The fin 22 is constituted of a thin flexible material which can be formed by stamping, pressing and cutting into the desired shape, after which time it is then attached to the elongate body. When the lure 20 is immersed in water, and moved relative thereto the fin undulates and ripples to create live action.

Various modifications and changes can be made as is apparent, e.g., as in the size, shape and materials of construction, without departing the spirit and scope of the invention. For example, the fins can be permanently affixed to the elongated body, or the back portion of the elongated body can be slotted and made receptive to changable fins. This feature permitting removal of the fins, and change thereof would allow for change of colors and types of fins. The upper edges of the fins can be smooth, or serrated.

Having described the invention, what is claimed is:

1. As an article of manufacture, an aquatic fishing lure for use with a rod, line and hook, by virtue of which the lure can be attached via the line to the rod and used in casting, comprising an elongate body member, and a thin, flexible elongate dorsal fin which extends longitudinally over a major portion of the length of the body member, said fin including an inner side which is attached in substantially a straight line with, continuous and tautly adjoined throughout its length to said elongate body member, and an outer, unattached side of longer length than said inner side, said outer side being continuous loose, gathered and laying on both sides of the line formed by the inner side of said fin, and ruffled as contrasted with said inner side, some of said ruffles lying to one side of a vertical plane through said straight line, and others of the ruffles lying to the other side, whereby on casting the lure into water, and the lure is moved relatively thereto, the outer side of the fin will undulate, or ripple to simulate life-like action.

2. The article of manufacture of claim 1 wherein the elongate body is of generally cylindrical cross-section and worm-like in appearance, the fin forms an integral portion of said body, the lure is constituted of a plastic of flesh-like consistency, and the lure is formed by injection molding.

3. The article of manufacture of claim 2 wherein the elongate body of the worm-like lure is striated, and formed into knob-like segments which extend over the length of said body.

4. The article of manufacture of claim 3 wherein the elongate body of the worm-like lure is constituted of head and tail portions, and the tail portion of the worm is shaped to resemble the (candal) caudal fin of a fish.

5. The article of manufacture of claim 2 wherein the worm (type)-like fishing lure is constituted entirely of worm type plastic.

6. The article of manufacture of claim 2 wherein the fin extends over at least 75 percent of the length of the elongate body.

7. The article of manufacture of claim 2 wherein the fin extends over 75 percent to about 95 percent of the length of the elongate body.

8. The article of manufacture of claim 2 wherein the elongate body on which the flexible fin is extended is of fish-like shape in appearance.

9. The article of manufacture of claim 8 wherein the (elongate body is provided with a) flexible fin (which) extends over at least 75 percent of the length of the elongate body.

10. The article of manufacture of claim 8 wherein the (elongate body is provided with a) flexible fin (which) extends over at least about 75 to about 95 percent of the length of the elongate body.

* * * * *